United States Patent
Negoro

[11] Patent Number: 5,892,154
[45] Date of Patent: Apr. 6, 1999

[54] ACCELERATION DETECTION DEVICE

[75] Inventor: Yasuhiro Negoro, Yokohama, Japan

[73] Assignee: Murata Manufacturing Co., Ltd., Japan

[21] Appl. No.: 934,713

[22] Filed: Sep. 22, 1997

Related U.S. Application Data

[62] Division of Ser. No. 706,825, Sep. 3, 1996, abandoned.

[30] Foreign Application Priority Data

Sep. 4, 1995 [JP] Japan .................................. 7-250222

[51] Int. Cl.$^6$ ............................................... G01P 15/125
[52] U.S. Cl. ....................................................... 73/514.32
[58] Field of Search ........................... 73/514.01, 514.16, 73/514.32, 514.35, 514.36; 361/280, 283.1, 283.2, 283.3

[56] References Cited

U.S. PATENT DOCUMENTS

| | | | |
|---|---|---|---|
| 4,483,194 | 11/1984 | Rudolf | 73/514.18 |
| 4,699,006 | 10/1987 | Boxenhorn | 73/514.32 |
| 4,920,801 | 5/1990 | Church | 73/514.16 |
| 4,955,108 | 9/1990 | Pier | 73/514.23 |
| 5,048,319 | 9/1991 | Neyhays | 73/514.17 |
| 5,285,097 | 2/1994 | Hirai | 257/417 |
| 5,406,848 | 4/1995 | Okada | 73/514.32 |
| 5,412,987 | 5/1995 | Bergstrom et al. | 73/514.36 |
| 5,425,750 | 6/1995 | Moberg | 73/514.36 |
| 5,526,687 | 6/1996 | Ueyanagi | 73/514.16 |

FOREIGN PATENT DOCUMENTS

| | | |
|---|---|---|
| 03691352 | 11/1989 | European Pat. Off. . |
| 611967 A1 | 3/1994 | European Pat. Off. . |
| 9414076 | 6/1994 | WIPO . |
| 9502431 | 1/1995 | WIPO . |

OTHER PUBLICATIONS

"An electrostatic servo–type three–axis silicon accelerometer", Keiji Jono et al, 8056 Journal of Physics E. Scientific Instruments, No. 1, Bristol, GB, Jan. 1995.

*Primary Examiner*—Hezron Williams
*Assistant Examiner*—Richard A. Moller
*Attorney, Agent, or Firm*—Ostrolenk, Faber, Gerb & Soffen, LLP

[57] ABSTRACT

An acceleration detection device is provided which is capable of detecting accelerations in two or more directions. The base end of a beam is fixed to a support section on a board. A weight is provided in the front end of the beam which is formed so as to extend horizontally along the board surface with a gap with it and the surface of the board. The position of the center of gravity G of the weight is set at a position spaced perpendicularly apart from the center axis of the beam in order that the inertial moment acts when an acceleration along the length (in the X direction) of the beam is applied. The front end surface of the weight is formed into an upright surface of a movable electrode, and a fixed electrode is formed at a position facing the movable electrode with a gap therebetween. When an acceleration in the X or Y direction is applied, the beam is flexed upwardly or downwardly in proportion to the magnitude of the acceleration, causing the weight to be inclined upwardly or downwardly while being displaced upwardly or downwardly. Thus, the electrostatic capacity between the movable electrode and the fixed electrode increases or decreases. The magnitude of the acceleration can be detected on the basis of the amount of such change of the electrostatic capacity.

8 Claims, 7 Drawing Sheets

ACCELERATION DETECTION DEVICE

This is a Divisional of application Ser. No. 08/706,825 filed on Sep. 3, 1996, now abandoned.

BACKGROUND OF THE INVENTION

1. Field of the Invention

The present invention relates to an acceleration detection device for use in an acceleration detection sensor.

2. Description of the Related Art

FIG. 11 shows an example of a conventional acceleration detection device 18. The acceleration detection device 18 comprises a board 20, a support section 25, a beam 21 in the shape of a cantilever, a weight 22, movable electrodes 23a and 23b, and fixed electrodes 24a and 24b. Referring to FIG. 11, the support section 25 is securely formed on the board surface of the board 20, with the base end of the beam 21 being connected to the support section 25. The beam 21 is formed so as to extend horizontally along the board surface with a gap between it and the board surface of the board 20, with the weight 22 being provided at the extension end of the beam 21. The weight 22 is formed symmetrically between the upper and lower halves with respect to the center axis along the length of the beam 21, with the position of the center of gravity G of the weight 22 at the center axis. The movable electrode 23a is formed on the surface of weight 22 facing the board, and the movable electrode 23b is formed on the opposite surface of weight 22. Further, the fixed electrodes 24a and 24b are provided which face the movable electrodes 23a and 23b, respectively, each with a gap therebetween.

Connected to the movable electrodes 23a and 23b and the fixed electrodes 24a and 24b are detection means (not shown) for performing detection by applying a voltage between the movable electrodes 23a and 23b and the fixed electrodes 24a and 24b which face each other and by converting the electrostatic capacity between the movable electrodes 23a and 23b and the fixed electrodes 24a and 24b into a voltage.

The acceleration detection device 18 constructed as described above is designed to detect an acceleration in a direction (in the Y direction in the example shown in the figure) perpendicular to the board surface of the board 20. When an upward and downward acceleration (an upward and downward acceleration in the Y direction) in the direction shown in FIG. 11, perpendicular to the surface of the board 20, is applied, an upward and downward inertial force in the Y direction corresponding to the direction and the magnitude of the acceleration occurs (to be specific, when an acceleration occurs upwardly, the inertial force occurs downwardly; when, on the contrary, an acceleration occurs downwardly, the inertial force occurs upwardly). This inertial force causes the beam 21 to be flexibly deformed, causing the weight 22 to be displaced. That is, the movable electrodes 23a and 23b are displaced integrally with the weight 22, and the electrode-to-electrode distance between the movable electrodes 23a and 23b and the fixed electrodes 24a and 24b varies. For this reason, the electrostatic capacity between the movable electrodes 23a and 23b and the fixed electrodes 24a and 24b varies. The magnitude of the upward and downward acceleration or the like is detected on the basis of the amount of such change of the electrostatic capacity.

However, in the acceleration detection device 18 having the above-described construction, since the position of the gravity G of the weight 22 is on the center axis of the beam 21, when an acceleration along the length (in the X direction) of the beam 21 is applied, an inertial moment does not act on the beam 21, and the weight 22 is not displaced. Therefore, the electrostatic capacity between the movable electrodes 23a and 23b and the fixed electrodes 24a and 24b does not vary, and therefore, an acceleration in the X direction cannot be detected. That is, in the acceleration detection device 18 constructed as described above, only the acceleration in the Y direction perpendicular to the surface of the board 20 can be detected. Of course, it is not possible to detect the magnitude of acceleration in two or more directions.

SUMMARY OF THE INVENTION

The present invention has been achieved to solve the above-described problems. It is an object of the present invention to provide an acceleration detection device which is capable of detecting acceleration in two or more directions through the use of a single acceleration detection device.

The foregoing and other objects of the invention are achieved by an acceleration detection device which includes a cantileveredly mounted flexible beam having a horizontally extending axis. A weight is provided at the free end of the beam, the center of gravity of the beam being spaced vertically from the axis of the beam so that the beam flexes when acceleration is applied to the weight. A movable electrode is arranged to move with the flexing of the beam and a fixed electrode is fixedly mounted adjacent to but spaced from the movable electrode. The fixed and movable electrodes form a capacitor, the capacitance of which is a function of the spacing between the movable and fixed electrodes which varies in accordance with the acceleration applied to the weight.

According to a first aspect of the present invention there is provided an acceleration detection device, wherein a cantilever which extends horizontally along a surface of a board is formed on the board with a gap between it and the surface of the board, with one end of the cantilever being fixed onto the board, and a weight is provided in the front end of the cantilever. The front-end surface of the weight is formed into an upright surface of a movable electrode, a fixed electrode is provided at a facing position with a gap between it and the surface of the movable electrode of the weight, and the position of the gravity of the weight is set at a position spaced perpendicularly apart from the center axis along the length of the cantilever so that the beam can be flexibly deformed when an acceleration along the length of the cantilever is applied.

According to a second aspect of the present invention, there is provided an acceleration detection device, wherein a cantilever which extends horizontally along a surface of a board is formed on the board with a gap between it and the surface of the board, with one end of the cantilever being fixed onto the board, a movable electrode is formed on a surface facing the board, and a fixed electrode is formed on a board surface facing the movable electrode on the front end side of the cantilever, a weight is provided in the front end of the cantilever, and the position of the gravity of the weight is set at a position spaced perpendicularly apart from the center axis along the length of the cantilever so that the beam can be flexibly deformed when an acceleration along the length of the cantilever is applied.

According to a third aspect of the present invention, there is provided an acceleration detection device in accordance with the first aspect of the present invention, wherein an upright surface of the movable electrode is formed also on the back-end surface in the weight provided on the front-end side of the cantilever, a fixed electrode is provided each at a position facing, with a gap, the surface of the movable electrode on the front-end surface of the weight and facing, with a gap, the surface of the back-end surface of the weight.

According to a fourth aspect of the present invention, there is provided an acceleration detection device, wherein two or more acceleration detection devices in accordance with the first aspect of the present invention are formed. According to a fifth aspect of the present invention, there is provided an acceleration detection device, wherein two or more acceleration detection devices in accordance with the third aspect of the present invention are formed. According to a sixth aspect of the present invention, there is provided an acceleration detection device, wherein two or more acceleration detection devices in accordance with the second aspect of the present invention are formed.

According to a seventh aspect of the present invention, there is provided an acceleration detection device, wherein when the number of two or more acceleration detection devices in accordance with the fourth, fifth and sixth aspects of the present invention is set at N, the respective acceleration detection devices are arranged mutually at a plane angle of 360°/N.

In the present invention constructed as described above, since the position of the gravity of the weight is set at a position spaced perpendicularly apart from the center axis along the length of the cantilever, when an acceleration along the length (e.g., in the X direction) of the cantilever is applied, an inertial moment acts on the beam in proportion to the magnitude of the acceleration, and the beam is flexibly deformed in a direction (e.g., in the Y direction) perpendicular to the board surface, causing the weight to be displaced. That is, the movable electrode is displaced, and the electrode-to-electrode distance between the movable electrode and the fixed electrode varies. In correspondence with the amount of the change of the electrode-to-electrode distance, the electrostatic capacity between the movable electrode and the fixed electrode increases or decreases, and thus the magnitude of the acceleration can be detected on the basis of the amount of such change of the electrostatic capacity.

Further, when an acceleration in a direction (in the Y direction) perpendicular to the board surface is applied, an inertial force proportional to the magnitude of the acceleration acts on the cantilever and the weight, causing the beam to be flexibly deformed in a direction (in the Y direction) perpendicular to the board surface and causes the weight to be displaced. Thereupon, in the same way as that stated above, the electrode-to-electrode distance between the movable electrode and the fixed electrode varies, and the electrostatic capacity between the movable electrode and the fixed electrode increases or decreases. Thus, the magnitude of the acceleration can be detected on the basis of the amount of such change of the electrostatic capacity.

The above and further objects, aspects and novel features of the invention will become more apparent from the following detailed description when read in connection with the accompanying drawings.

DESCRIPTION OF THE PREFERRED EMBODIMENTS

The preferred embodiments of the present invention will be described below with reference to the accompanying drawings.

Figure 1:
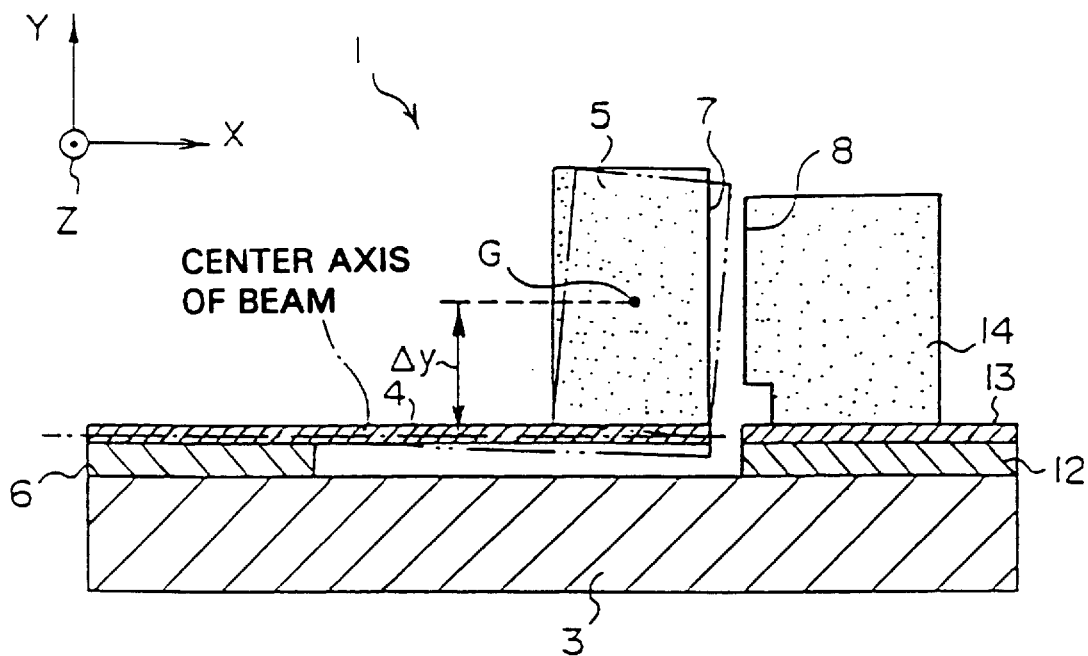
FIG. 1 is an illustration of a first embodiment of the present invention.

FIG. 1 shows the main components of an acceleration detection device 1 according to a first embodiment of the present invention. The acceleration detection device 1 comprises a board 3, a support section 6, a beam 4 in the shape of a cantilever, a weight 5, a movable electrode 7, and a fixed electrode 8. Referring to FIG. 1, the support section 6 made of $SiO_2$ or the like is securely formed on the board surface of the board 3 made of Si or the like, with the base end of the beam 4 made of Si or the like being fixed to the support section 6. The beam 4 is formed so as to extend horizontally (in the X direction in the example shown in the figure) along the board surface with a gap between it and the board surface, with the weight 5 laminated with a conductor metal of an Fe-Ni alloy or the like being provided in the extension end of the beam 4. The position of the center of gravity G of the weight 5 is set at a position which is spaced perpendicularly (upwardly) apart by $\Delta y$ shown in FIG. 1 from the center axis along the length of the beam 4 so that when an acceleration in the X direction, which is along the length of the beam 4 is applied, the beam 4 is flexibly deformed in a direction (in the Y direction in the example shown in the figure) perpendicular to the board surface due to the inertial moment.

The front-end surface of the weight 5 is formed into an upright surface of the movable electrode 7, with the fixed electrode 8 being provided at a facing position with a gap between it and the movable electrode 7. The fixed electrode 8 is formed by laminating a conductor metallic layer 14 of an Fe-Ni alloy or the like on where an $SiO_2$ layer 12 and a polycrystalline Si layer 13 are laminated on the board surface of the board 3, with the surface of the conductor metallic layer 14 facing the movable electrode 7 being formed into a surface of the fixed electrode 8.

Connected to the acceleration detection device 1 constructed as described above is signal processing means (not shown) for detecting the electrostatic capacity between the movable electrode 7 and the fixed electrode 8, processing the voltage signal, and determining the magnitude of the acceleration or the like. The acceleration detection device 1 detects the acceleration along the length (in the X direction)

of the beam 4 and the acceleration in a direction (in the Y direction) perpendicular to the board surface of the board 3 in the following way.

When an acceleration along the length (in the side-to-side X direction) of the beam 4 in the side-to-side direction shown in FIG. 1 is applied to the acceleration detection device 1, as described above, the position of the center of gravity G of the weight 5 is at a position which is spaced upwardly apart by $\Delta y$ from the center axis along the length of the beam 4. Therefore, an inertial moment acts on the beam 4 in proportion to the acceleration in the aforementioned side-to-side X direction. For this reason, the beam 4 is flexibly deformed in an upward and downward direction (in the upward and downward Y direction) perpendicular to the board surface of the board 3 (to be specific, when an acceleration in a leftward X direction occurs, the beam 4 is flexed downward, and when an acceleration in a rightward X direction occurs, the beam 4 is flexed upward), causing the weight 5 to be displaced vertically. When, for example, the beam 4 is flexibly deformed toward the board 3 side and the weight 5 is displaced downward, as indicated by the chain line of FIG. 1, the weight 5 is inclined to the fixed electrode 8 side. When, on the contrary, the weight 5 is displaced upward, the fixed electrode 8 is inclined in a direction opposite to that described above. Because of this, the electrode-to-electrode gap (distance) between the movable electrode 7 and the fixed electrode 8 varies in proportion to the magnitude of the acceleration in the side-to-side X direction, causing the electrostatic capacity between the movable electrode 7 and the fixed electrode 8 to increase or decrease. The magnitude of the acceleration or the like is detected on the basis of the amount of such change of the electrostatic capacity.

Further, when an upward and downward (the upward and downward Y direction) acceleration perpendicular to the surface of the board 3 is applied, an upward and downward inertial force in the Y direction occurs in proportion to the magnitude of the acceleration, the beam 4 is flexibly deformed due to this inertial force. In the same way as that described above, the weight 5 is displaced vertically and inclined. The electrode-to-electrode gap between the movable electrode 7 and the fixed electrode 8 varies, causing the electrostatic capacity between the movable electrode 7 and the fixed electrode 8 to increase or decrease. The magnitude of the acceleration or the like is detected on the basis of the amount of such change of the electrostatic capacity.

According to this embodiment, since the weight 5 is formed so that the position of the center of gravity G of the weight 5 is at a position spaced vertically (upwardly) apart from the center axis along the length of the beam 4, when an acceleration along the length (in the X direction) of the beam 4 is applied, an inertial moment acts on the beam 4 in proportion to the magnitude of the acceleration, the beam 4 is flexibly deformed, and the weight 5 is displaced vertically and inclined. For this reason, the electrode-to-electrode distance (gap) between the movable electrode 7 and the fixed electrode 8 varies, causing the electrostatic capacity between the movable electrode 7 and the fixed electrode 8 to vary. Thus, the magnitude of the acceleration can also be detected for the acceleration in the X direction on the basis of the amount of such change of the electrostatic capacity. Of course, since the acceleration in the Y direction perpendicular to the board 3 can be detected, it becomes possible to detect the magnitude of the acceleration in both the X and Y directions.

A second embodiment of the present invention will now be described with reference to FIG. 2. Those components in the second embodiment which are the same as or perform the same function as those components in the first embodiment are given the same reference numerals or the same reference numerals primed, and a description thereof is omitted.

Figure 2:
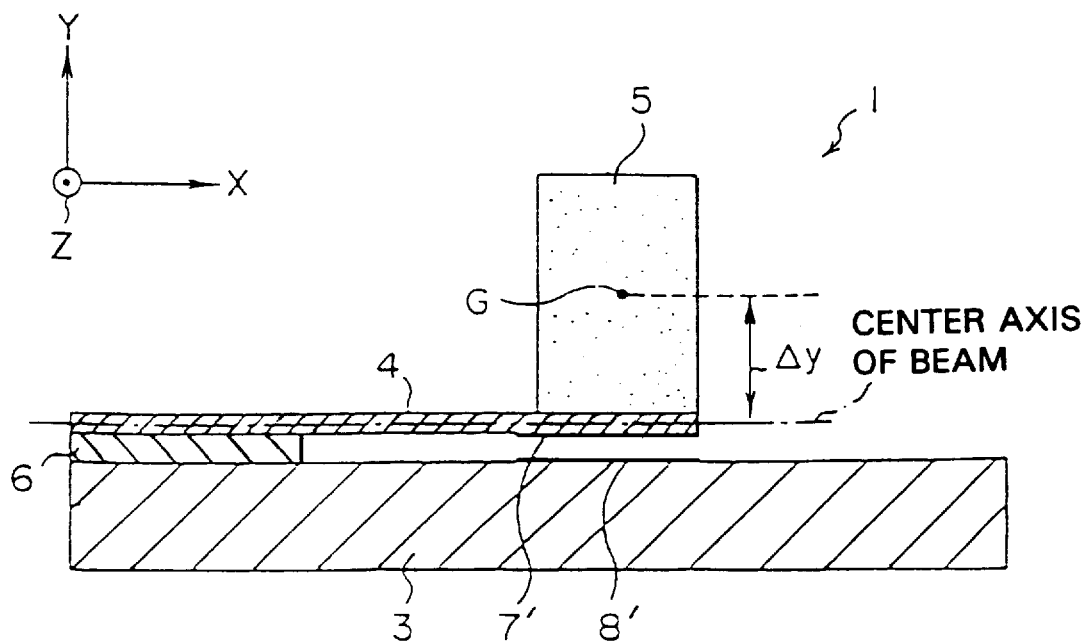
FIG. 2 is an illustration of a second embodiment of the present invention.

The acceleration detection device 1 of the second embodiment comprises, as shown in FIG. 2, the board 3, the support section 6, the beam 4 in the shape of a cantilever, the weight 5, the movable electrode 7', and the fixed electrode 8'. The support section 6 made of $SiO_2$ or the like is securely formed on the board surface of the board 3 made of Si or the like. The beam 4 is formed so as to extend horizontally (along the X direction in the example shown in the figure) along the board surface with a gap between it and the board surface, with the weight 5 laminated with a conductor metal of an Fe—Ni alloy or the like being provided on the extension end side of the beam 4. The position of the center of gravity G of the weight 5 is set at a position which is spaced vertically (upwardly) apart by $\Delta y$ shown in FIG. 2 from the center axis along the length of the beam 4 so that when an acceleration in the X direction which is along the length of the beam 4 is applied, the beam 4 can be flexibly deformed in a direction (in the Y direction in the example shown in the figure) perpendicular to the board surface. Further, the movable electrode 7' is formed on the surface facing the board on the front end side of the beam 4, and the fixed electrode 8' is formed on the surface of the board 3 facing the movable electrode 7' with a gap therebetween.

In the same way as in the first embodiment, connected to the acceleration detection device 1 constructed as described above is signal processing means (not shown) for detecting the electrostatic capacity between the movable electrode 7' and the fixed electrode 8', processing the voltage signal, and determining the magnitude of the acceleration or the like. The acceleration detection device 1 detects the acceleration along the length (in the X direction) of the beam 4 and the acceleration in a direction (in the Y direction) perpendicular to the surface of the board 3 in the following way.

When an acceleration in the side-to-side X direction shown in FIG. 2 is applied to the acceleration detection device 1, as described above, the position of the center of gravity G of the weight 5 is at a position which is spaced upwardly apart by $\Delta y$ from the center axis along the length of the beam 4. Therefore, an inertial moment acts on the beam 4 in proportion to the acceleration in the aforementioned side-to-side X direction in the same way as in the first embodiment, causing the beam 4 to be flexibly deformed in an upward and downward direction and causes the weight 5 to be displaced vertically. That is, the movable electrode 7' is displaced vertically, and the electrode-to-electrode gap between the movable electrode 7' and the fixed electrode 8' varies, causing the electrostatic capacity between the movable electrode 7' and the fixed electrode 8' to increase or decrease. The magnitude of the acceleration or the like is detected on the basis of the amount of such change of the electrostatic capacity.

Further, when an acceleration in an upward and downward Y direction is applied, an inertial force in the upward and downward Y direction occurs in proportion to the magnitude of the acceleration, the beam 4 is flexibly deformed due to this inertial force, and the weight 5 is displaced. That is, as stated above, the movable electrode 7' is displaced, and the electrode-to-electrode gap between the movable electrode 7' and the fixed electrode 8' varies, causing the electrostatic capacity between the movable electrode 7' and the fixed electrode 8' to increase or decrease. The magnitude of the acceleration or the like is detected on the basis of the amount of such change of the electrostatic capacity.

According to the second embodiment, accelerations in both the X and Y directions can be detected in the same way as in the first embodiment.

A third embodiment of the present invention will now be described with reference to FIGS. 3A and 3B. Those components in the third embodiment which are the same or perform the same function as those components in the first embodiment are given the same reference numerals or the same reference numerals and letter suffixes, and a description thereof is omitted.

Figure 3A:
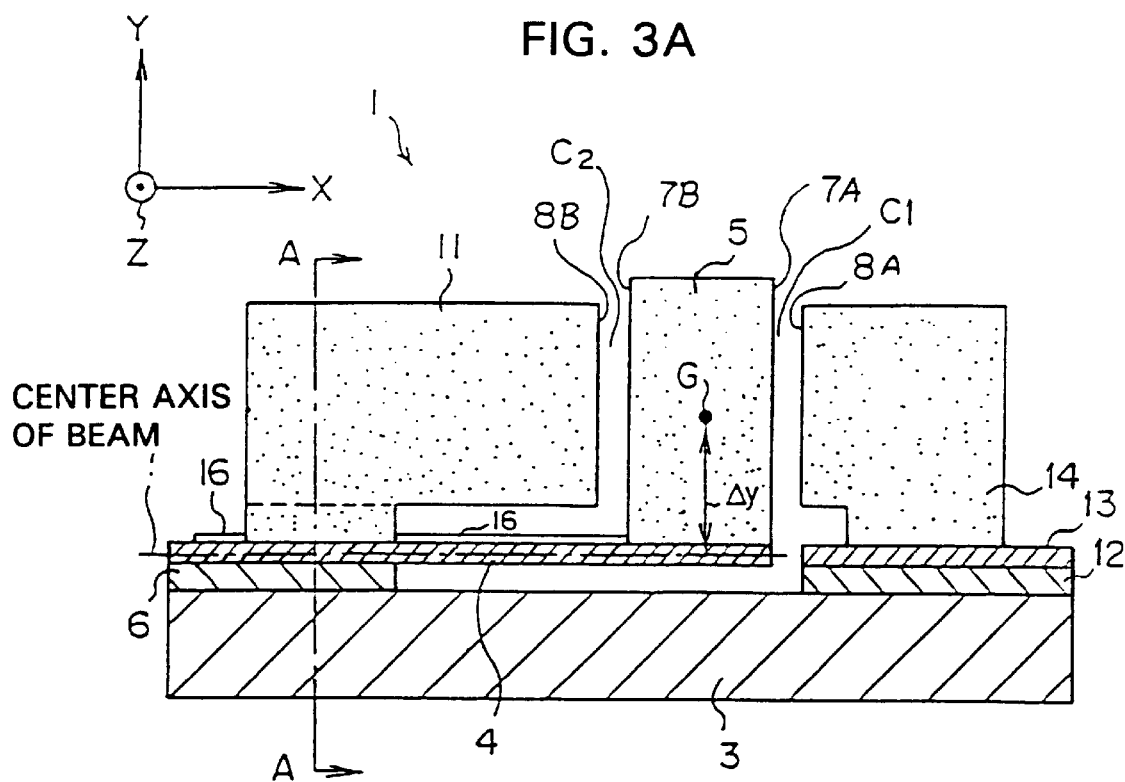
FIGS. 3A and 3B are illustrations of a third embodiment of the present invention.

A feature of this embodiment which is different from the first embodiment is that, as shown in FIG. 3A, the back-end surface of the weight 5 is also formed into the upright electrode surface of the movable electrode 7B, and the fixed electrode 8B which faces the movable electrode 7B is provided with a gap therebetween, and the magnitude of the acceleration can be detected with a higher degree of accuracy. The fixed electrode 8B is formed by laminating a conductor metallic layer 11 of an Fe—Ni alloy or the like on the support section 6, and the surface of the conductor metallic layer 11 facing the movable electrode 7B is formed into the surface of the fixed electrode 8B. The construction other than that described above is substantially the same as that of the above-described first embodiment.

In this embodiment, an electrostatic capacity $C_1$ between the movable electrode 7A and the fixed electrode 8A, and an electrostatic capacity $C_2$ between the movable electrode 7B and the fixed electrode 8B are substantially equal to each other when an acceleration is not applied, and $C_1 = C_2 = C_0$ is thereby satisfied. Further, when an acceleration in the X or Y direction is applied, in a case in which, for example, $C_1$ is increased by $\Delta C$ with respect to $C_0$, $C_2$ is decreased by $\Delta C'$ ($\Delta C'$ is almost equal to $\Delta C$). In the above way, the electrostatic capacities C1 and C2 are formed so as to vary by nearly the same degree.

Figure 3B:
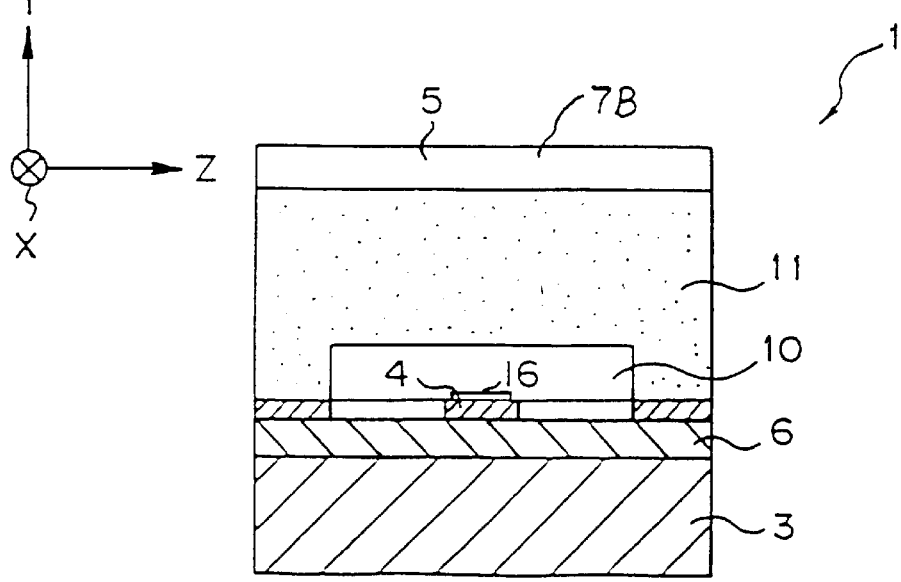

Further, as shown in FIG. 3B, a tunnel hole 10 for passing the beam 4 therethrough is provided in the central portion of the conductor metallic layer 11. The gap between the ceiling surface of the tunnel hole 10 and the beam 4 is opened to such an extent so as not to obstruct the flexing and deformation of the beam 4 due to the acceleration. A conductor pattern 16 for applying a voltage to the movable electrodes 7A and 7B of the weight 5 is formed on the beam 4, as shown in FIGS. 3A and 3B. The thickness of the conductor pattern 16 is extremely thin, and they are sufficiently apart so that the electrostatic capacity between the conductor pattern 16 and the conductor metallic layer 11 becomes small.

In the acceleration detection device 1 having the construction shown in FIG. 3A, as a result of the application of an acceleration along the length (in the X direction) of the beam 4 or in a direction (in the Y direction) perpendicular to the board surface of the board 3, in the same way as in the first embodiment, the beam 4 is flexibly deformed vertically in proportion to the magnitude of the acceleration, causing the weight 5 to be inclined while being displaced vertically. When the weight 5 is displaced downward, as described in the first embodiment, the weight 5 is inclined toward the fixed electrode 8A side shown in FIG. 3A, the electrode-to-electrode gap between the movable electrode 7A and the fixed electrode 8A becomes narrower, and on the contrary, the electrode-to-electrode gap between the movable electrode 7B and the fixed electrode 8B is widened. For this reason, the electrostatic capacity $C_1$ between the movable electrode 7A and the fixed electrode 8A, for example, increases by $\Delta C$ with respect to the $C_0$. On the contrary, the electrostatic capacity $C_2$ between the movable electrode 7B and the fixed electrode 8B, for example, decreases by $\Delta C'$ ($\Delta C'$ is nearly equal to $\Delta C$) with respect to the $C_0$. By subtracting $C_2 = C_0 - \Delta C'$ from the $C_1 = C_0 + \Delta C$ (or by subtracting $C_1$ from $C_2$), the following is obtained:

$C_1 - C_2 = (C_0 + \Delta C) - (C_0 - \Delta C') = \Delta C + \Delta C'$.

The amount of change of the electrostatic capacity can be easily obtained. Thus, the magnitude of the acceleration can be detected on the basis of the amount of such change of the electrostatic capacity.

Since in the above calculated electrostatic capacity $\Delta C + \Delta C'$, $\Delta C'$ is nearly equal to $\Delta C$, a rearrangement can be made as: $\Delta C + \Delta C' \approx 2\Delta C$. That is, an amount of change of the electrostatic capacity substantially twice as large can be obtained than a case in which only a pair of a movable electrode and a fixed electrode are provided. Thus, it is possible to detect the magnitude of the acceleration with a high degree of accuracy.

Further, when the weight 5 is displaced upward, the weight 5 is inclined toward the fixed electrode 8B side. In contrast to that described above, the electrode-to-electrode gap between the movable electrode 7A and the fixed electrode 8A is widened, and the electrostatic capacity $C_1$ between the movable electrode 7A and the fixed electrode 8A decreases with respect to $C_0$. On the contrary, the electrode-to-electrode gap between the movable electrode 7B and the fixed electrode 8B becomes narrower, and the electrostatic capacity $C_2$ between the movable electrode 7B and the fixed electrode 8B decreases with respect to $C_0$. Similarly to that described above, the magnitude of the acceleration can be detected with a high degree of accuracy on the basis of the amount of difference between the electrostatic capacities $C_1$ and $C_2$.

According to this embodiment, an acceleration in both the X direction and the Y direction can be detected in the same way as in the first embodiment, the back-end surface of the weight 5 provided on the front-end surface side of the beam 4 is formed into the surface of the movable electrode 7B, and the fixed electrode 8B which faces the movable electrode 7B with a gap therebetween is provided. Therefore, both the electrostatic capacity $C_1$ between the movable electrode 7A and the fixed electrode 8A and the electrostatic capacity $C_2$ between the movable electrode 7B and the fixed electrode 8B, which electrostatic capacities are increased or decreased due to the acceleration in the X or Y direction, can be obtained, and thus it becomes possible to detect the magnitude of the acceleration in both the X and Y directions with a higher degree of accuracy on the basis of the amount of such change of the electrostatic capacity.

In the meantime, the following sometimes occurs. When an acceleration in a direction (in the Z direction) perpendicular to the direction along the length of the beam 4 along the surface of the board 3 is applied, the beam 4 swings slightly in the Z direction due to the inertial force, causing the weight 5 to be displaced in the Z direction. Therefore, the electrode-to-electrode area between the movable electrodes 7A and 7B and the fixed electrodes 8A and 8B decreases, and the electrostatic capacities $C_1$ and $C_2$ decrease each by nearly the same degree. However, as in this embodiment, the amount of the change of the electrostatic capacity due to the acceleration in the Z direction is removed by determining the amount of difference between the electrostatic capacities C1 and C2, for example, when C1 and C2 each decrease by $\Delta C$ due to the acceleration in the Z direction, the following is satisfied:

$C_1 - C_2 = (C_0 - \Delta C) - (C_0 - \Delta C) = 0$.

For this reason, it is possible to detect only the acceleration in the X and Y directions with a high degree of accuracy.

Further, since the fixed electrodes 8A and 8B which face each other are provided on the front-end surface and the back-end surface of the weight 5 each with a gap therebetween, even if an extremely large acceleration is applied and the weight 5 is going to be displaced excessively, the fixed electrodes 8A and 8B act as stoppers for the weight 5, thus preventing the weight 5 from being displaced excessively. That is, the beam 4 is prevented from being flexibly deformed excessively, thereby preventing the beam 4 from being damaged. Thus, it is possible to increase the resistance to impact of the acceleration detection device 1.

A fourth embodiment of the present invention will now be described with reference to FIG. 4. Those components in the fourth embodiment which are the same as or perform the same function as those components in the first embodiment are given the same reference numerals or are given the same reference numerals followed by letter suffixes, and a description thereof is omitted.

A feature of this embodiment is that two acceleration detection devices 1A and 1B which are the same as the acceleration detection device 1 described in the first embodiment are provided. As shown in FIG. 4, the acceleration detection devices 1A and 1B are provided symmetrically with respect to the symmetry reference plane perpendicular to the board 3 between conductor metallic layers 14A and 14B with the conductor metallic layer 14A and 14B facing each other. The other construction is basically the same as that of the first embodiment.

In this embodiment, the electrostatic capacity $C_1$ between the movable electrode 7A and the fixed electrode 8A of the acceleration detection device 1A and the electrostatic capacity $C_2$ between the movable electrode 7B and the fixed electrode 8B of the acceleration detection device 1B are almost equal to each other when no acceleration is applied, and $C_1=C_2=C_0$ is thereby satisfied. When an acceleration in the X or Y direction is applied, the electrostatic capacities $C_1$ and $C_2$ are formed so as to vary each by nearly the same degree, as described below.

Figure 4:
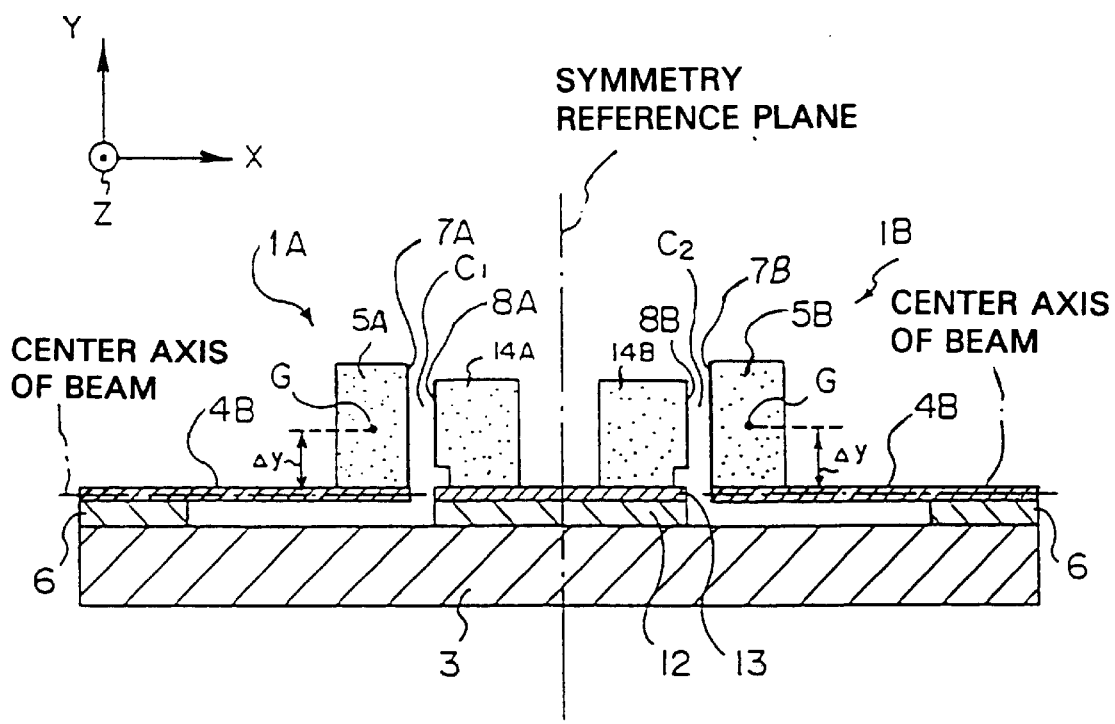
FIG. 4 is an illustration of a fourth embodiment of the present invention.

When a rightward acceleration shown in FIG. 4 along the length (in the rightward X direction) of the beam 4 is applied, on the acceleration detection device 1A side, the beam 4A is flexibly deformed upwardly in proportion to the magnitude of the acceleration due to the inertial moment, and the weight 5A is inclined toward the left side while being displaced upwardly. On the acceleration detection device 1B side, the beam 4B is flexibly deformed downwardly, and the weight 5B is inclined toward the left side while being displaced downwardly. For this reason, the electrode-to-electrode gap between the movable electrode 7A and the fixed electrode 8A becomes wider, and the electrostatic capacity $C_1$ between the movable electrode 7A and the fixed electrode 8A, for example, decreases by $\Delta C$ with respect to $C_0$, as shown in Table 1. In contrast, the electrode-to-electrode gap between the movable electrode 7B and the fixed electrode 8B becomes narrower, and the electrostatic capacity $C_2$ between the movable electrode 7B and the fixed electrode 8B, for example, increases by $\Delta C'$ with respect to $C_0$ ($\Delta C'$ is almost equal to $\Delta C$).

TABLE 1

| Electrostatic Capacity | Direction of Acceleration | | | |
|---|---|---|---|---|
| | X Direction | | Y Direction | |
| | Rightward | Leftward | Upward | Downward |
| $C_1$ | $C_0 - \Delta C$ | $C_0 + \Delta C$ | $C_0 + \Delta C$ | $C_0 - \Delta C$ |
| $C_2$ | $C_0 + \Delta C'$ | $C_0 - \Delta C'$ | $C_0 + \Delta C'$ | $C_0 - \Delta C'$ |
| $C_1-C_2$ | $-2\Delta C$ | $2\Delta C$ | 0 | 0 |
| | ($\Delta C \leqslant \Delta C'$) | ($\Delta C \leqslant \Delta C'$) | ($\Delta C \leqslant \Delta C'$) | ($\Delta C \leqslant \Delta C'$) |

Further, when a leftward acceleration in the X direction is applied, the beam 4A of the acceleration detection device 1A is flexibly deformed downwardly in proportion to the magnitude of the acceleration due to the inertial moment, causing the weight 5A to be inclined toward the right side while being displaced downwardly. In contrast, the beam 4B of the acceleration detection device 1B is flexibly deformed upwardly, causing the weight 5B to be inclined toward the right side while being displaced upwardly. Therefore, the electrostatic capacity $C_1$, for example, increases by $\Delta C$ with respect to $C_0$, as shown in Table 1. In contrast, the electrostatic capacity $C_2$ decreases by $\Delta C'$, which is almost equal to $\Delta C$, with respect to $C_0$.

Further, when an upward and downward acceleration in a direction (in the upward and downward Y direction) perpendicular to the board 3 is applied, an upward and downward inertial force corresponding to the magnitude of the acceleration occurs. In the same way as that described above, the beams 4A and 4B are flexibly deformed, causing the weights 5A and 5B to be inclined while being displaced. As a result, the electrostatic capacities C1 and C2 increase or decrease by the same degree with respect to $C_0$, as shown in Table 1.

When the electrostatic capacities C1 and C2 are detected, the magnitude of the acceleration in both the X and Y directions can be detected on the basis of the amount of change of C1 and C2. Further, when the amount of difference such that $C_2$ is subtracted from $C_1$ (or the amount of difference such that $C_1$ is subtracted from $C_2$) is determined, as shown in Table 1, only the amount of change of C1 and C2 due to the acceleration in the X direction can be obtained. Thus, it is possible to detect only the magnitude of the acceleration in the X direction.

According to this embodiment, it is possible to detect the acceleration in both the X and Y directions in the same way as in the first embodiment. Further, since both the acceleration detection devices 1A and 1B are provided, and the devices are provided symmetrically with respect to the symmetry reference plane, when an acceleration in the X direction is applied, the flexing direction of the beam 4A of the acceleration detection device 1A becomes opposite to that of the beam 4B of the acceleration detection device 1B. As a result, the capacities C1 and C2 increase or decrease in such a way that when the electrostatic capacity $C_1$ increases, the capacity $C_2$ decreases. For this reason, the determination of the amount of difference between the electrostatic capacities C1 and C2 makes it possible to easily detect only the magnitude of the acceleration in the X direction. That is, not only the magnitude of the acceleration, but also the direction of the acceleration can be easily detected. Of course, since an amount of change of the electrostatic capacity larger than in a case in which a pair of the movable electrode 7 and the fixed electrode 8 which face each other are provided can be obtained, it is possible to detect the magnitude of the acceleration with a higher degree of accuracy.

A fifth embodiment of the present invention will now be described with reference to FIG. 5. Those components in the fifth embodiment which are the same as or perform the same function as those components in the third embodiment are given the same reference numerals or the same reference numerals with letter suffixes, and a description thereof is omitted.

Figure 5:
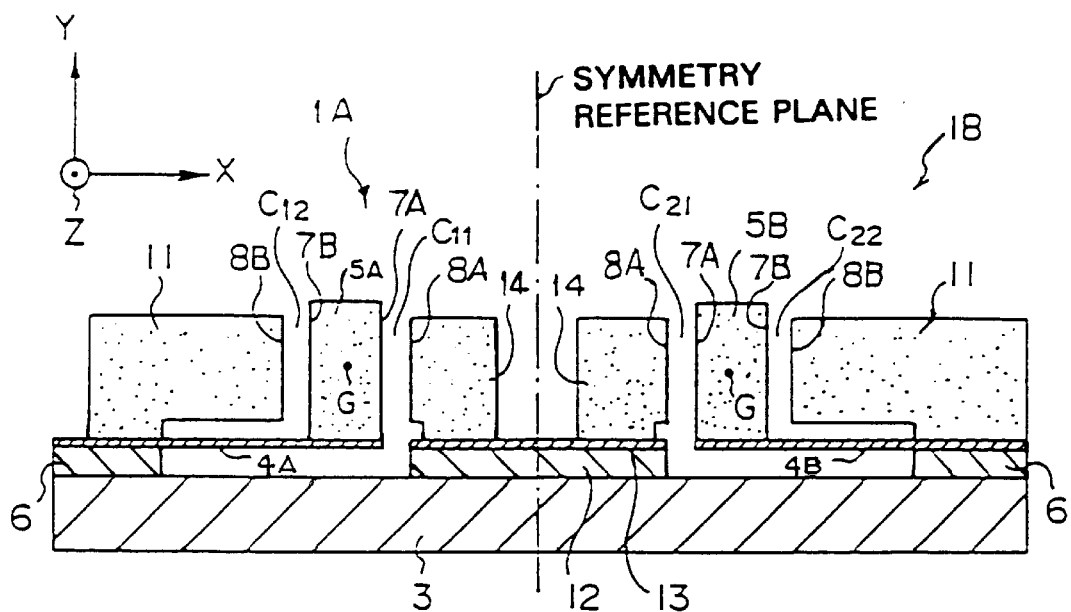
FIG. 5 is an illustration of a fifth embodiment of the present invention.

A feature of this embodiment is that two acceleration detection device 1 shown in the third embodiment are provided, and as shown in FIG. 5, the acceleration detection devices 1A and 1B are formed symmetrically with respect to the symmetry reference plane perpendicular to the board 3 between the conductor metallic layers 14 with the conductor metallic layers 14 facing each other. The other construction is basically the same as that of the third embodiment.

In this embodiment, as shown in FIG. 5, four pairs of the movable electrodes 7A and 7B and the fixed electrodes 8A and 8B which face each other are formed. The electrostatic capacities $C_{11}$, $C_{12}$, $C_{21}$ and $C_{22}$ which are generated between those movable electrodes 7A and 7B and fixed electrodes 8A and 8B are almost equal to each other when an acceleration is not applied, and $C_{11}=C_{12}=C_{21}=C_{22}=C_0$ is thereby satisfied. When an acceleration in the X or Y direction is applied, as shown in Table 2, electrostatic capacities C11, C12, C21 and C22 are formed in such a way that the electrostatic capacities vary by nearly the same amount.

TABLE 2

| Electrostatic Capacity | Direction of Acceleration | | | |
|---|---|---|---|---|
| | X Direction | | Y Direction | |
| | Rightward | Leftward | Upward | Downward |
| $C_{11}$ | $C_0 - \Delta C$ | $C_0 + \Delta C$ | $C_0 + \Delta C$ | $C_0 - \Delta C$ |
| $C_{12}$ | $C_0 + \Delta C'$ | $C_0 - \Delta C'$ | $C_0 - \Delta C'$ | $C_0 + \Delta C'$ |
| $C_{21}$ | $C_0 + \Delta C'$ | $C_0 - \Delta C'$ | $C_0 + \Delta C'$ | $C_0 - \Delta C'$ |
| $C_{22}$ | $C_0 - \Delta C$ | $C_0 + \Delta C$ | $C_0 - \Delta C'$ | $C_0 + \Delta C'$ |
| $C_{11}-C_{12}$ | $-\Delta C - \Delta C'$ | $\Delta C + \Delta C'$ | $\Delta C + \Delta C'$ | $-\Delta C - \Delta C'$ |
| $C_{21}-C_{22}$ | $\Delta C + \Delta C'$ | $-\Delta C - \Delta C'$ | $\Delta C + \Delta C'$ | $-\Delta C - \Delta C'$ |
| $(C_{11}-C_{12}) + (C_{21}-C_{22})$ | 0 | 0 | $2(\Delta C + \Delta C')$ | $-2(\Delta C + \Delta C')$ |
| $(C_{11}-C_{12}) - (C_{21}-C_{22})$ | $-2(\Delta C + \Delta C')$ | $2(\Delta C + \Delta C')$ | 0 | 0 |

If, for example, a rightward acceleration along the length (in the rightward X direction) of the beam 4 is applied, as described in the fourth embodiment, the weight 5A of the acceleration detection device 1A is inclined to the left while being displaced upwardly in proportion to the magnitude of the acceleration due to the inertial moment. In contrast, the weight 5B of the acceleration detection device 1B is inclined to the left while being displaced downwardly. As shown in Table 2, the electrostatic capacity $C_{11}$, for example, decreases by $\Delta C$ with respect to $C_0$, the $C_{12}$ increases by $\Delta C'$, which is almost the same as $\Delta C$, with respect to $C_0$, the $C_{21}$ increases by $\Delta C'$ with respect to $C_0$, and the $C_{22}$ decreases by $\Delta C$ with respect to $C_0$. Further, when a downward acceleration in a direction (in the downward Y direction) perpendicular to the board 3 is applied, the weight 5A is inclined to the left while being displaced upwardly in proportion to the magnitude of the acceleration due to the inertial force, and the weight 5B is inclined to the right while being displaced upwardly. As shown in Table 2, the electrostatic capacity $C_{11}$, for example, decreases by $\Delta C$ with respect to $C_0$, the $C_{12}$ increases by $\Delta C'$ with respect to $C_0$, the $C_{21}$ decreases by $\Delta C$ with respect to $C_0$, and the $C_{22}$ increases by $\Delta C'$ with respect to $C_0$.

In the same way as in the third embodiment, when the electrostatic capacities $C_{11}$, $C_{12}$, $C_{21}$ and $C_{22}$ are detected, and the $C_{12}$ is subtracted from the $C_{11}$ (or the $C_{11}$ is subtracted from the $C_{12}$), or the $C_{22}$ is subtracted from the $C_{21}$ (or the $C_{21}$ is subtracted from the $C_{22}$), as shown in Table 2, the amount of change of the electrostatic capacity can be easily determined. Thus, the magnitude of the acceleration or the like can be detected on the basis of the amount of such changes. When the sum of the amount of difference between the $C_{11}$ and $C_{12}$, and the amount of difference between the $C_{21}$ and $C_{22}$ is determined, as shown in Table 2, only the amount of change of the electrostatic capacity due to the acceleration in the Y direction can be detected. Therefore, only the magnitude of the acceleration in the Y direction can be detected. Further, when the difference obtained by subtracting the amount of difference between $C_{21}$ and $C_{22}$ from the amount of difference between $C_{11}$ and $C_{12}$ is determined, only the magnitude of the acceleration in the X direction can be detected.

According to this embodiment, the same excellent advantages as those of the third embodiment can be obtained. Further, since two acceleration detection devices 1 shown in the third embodiment are provided, and those acceleration detection devices 1A and 1B are provided symmetrically with respect to the symmetry reference plane, the flexing directions of the beams 4A and 4B are opposite to each other. As a result, when the difference between the amount of difference between the electrostatic capacities $C_{11}$ and $C_{12}$ and the amount of difference between the electrostatic capacities $C_{21}$ and $C_{22}$ is determined, only the magnitude of the acceleration along the length (in the X direction) of the beam 4 can be detected. Further, by determining the sum of the amount of difference between the electrostatic capacities $C_{11}$ and $C_{12}$ and the amount of difference between the electrostatic capacities $C_{21}$ and $C_{22}$ is determined, only the magnitude of the acceleration in a direction (in the Y direction) perpendicular to the board 3 can be detected. That is, it is possible to detect the magnitude of the acceleration and the direction of the acceleration with a higher degree of accuracy. Of course, since four pairs of the movable electrodes 7a and 7b and the fixed electrodes 8a and 8b are provided, an amount of an even larger change of the electrostatic capacity can be obtained, and thus the magnitude of the acceleration or the like can be detected with high accuracy.

A sixth embodiment of the present invention will now be described with reference to FIG. 6. Those components in the sixth embodiment which are the same as or perform the same function as those components in the second embodiment are given the same reference numerals or the same reference numerals followed by letter suffixes, and a description thereof is omitted.

Figure 6:
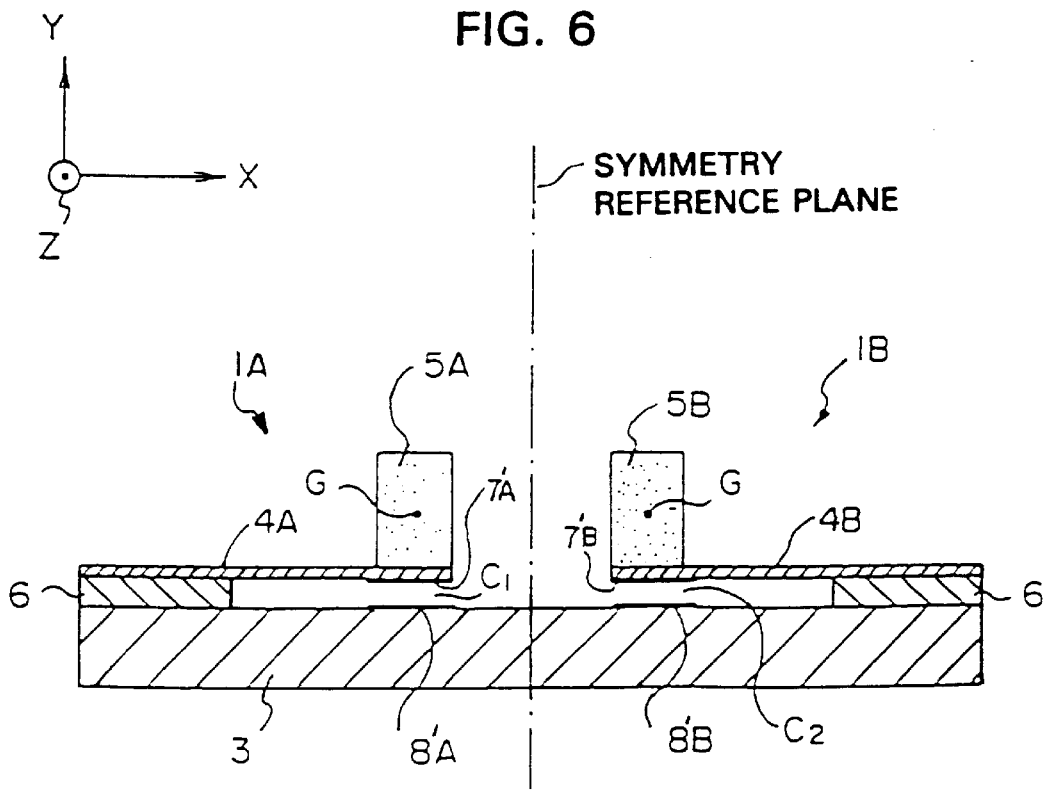
FIG. 6 is an illustration of a sixth embodiment of the present invention.

A feature of this embodiment is that two acceleration detection devices 1 described in the second embodiment are provided, as shown in FIG. 6, those acceleration detection devices 1A and 1B are formed symmetrically with respect to the symmetry reference plane perpendicular to the board 3 between the weights 5A and 5B with the weights 5A and 5B facing each other in the same way as in the fourth embodiment. The other construction is basically the same as that of the second embodiment.

In this embodiment, the electrostatic capacity $C_1$ between the movable electrode 7'A and the fixed electrode 8'A and the electrostatic capacity $C_2$ between the movable electrode 7'B and the fixed electrode 8'B are almost equal to each other when no acceleration is applied, and $C_1=C_2=C_0$ is thereby satisfied. When an acceleration in the X or Y direction is applied, the electrostatic capacities C1 and C2 are formed so as to vary by nearly the same degree, as shown in Table 3.

TABLE 3

| Electrostatic Capacity | Direction of Acceleration | | | |
|---|---|---|---|---|
| | X Direction | | Y Direction | |
| | Rightward | Leftward | Upward | Downward |
| $C_1$ | $C_0 - \Delta C$ | $C_0 + \Delta C$ | $C_0 + \Delta C$ | $C_0 - \Delta C$ |
| $C_2$ | $C_0 + \Delta C'$ | $C_0 - \Delta C'$ | $C_0 + \Delta C'$ | $C_0 - \Delta C'$ |
| $C_1-C_2$ | $-2\Delta C$ ($\Delta C \leqsim \Delta C'$) | $2\Delta C$ ($\Delta C \leqsim \Delta C'$) | 0 ($\Delta C \leqsim \Delta C'$) | 0 ($\Delta C \leqsim \Delta C'$) |

If, for example, a rightward acceleration is applied along the length (in the rightward X direction) of the beam 4 shown in FIG. 6, as described in the fourth embodiment, the weight 5A of the acceleration detection device 1A is displaced upwardly in proportion to the magnitude of the acceleration due to the inertial moment, and the weight 5B of the acceleration detection device 1B is displaced downwardly. As shown in Table 3, the electrostatic capacity $C_1$, for example, decreases by $\Delta C$ with respect to $C_0$, and the $C_2$ increases by $\Delta C'$ (the $\Delta C'$ is almost equal to $\Delta C$) with respect to $C_0$. Further, when an upward acceleration in a direction perpendicular to the board 3 (in the upward Y direction) is applied, the weights 5A and 5B are displaced downwardly in proportion to the magnitude of the acceleration due to the inertial force. As shown in table 3, the electrostatic capacity $C_1$, for example, increases by $\Delta C$ with respect to $C_0$, and the $C_2$ increases by $\Delta C'$, which is almost the same as $\Delta C$, with respect to $C_0$.

When the above-described electrostatic capacities $C_1$ and $C_2$ are detected, the magnitude of the acceleration in the X or Y direction can be detected on the basis of the amount of the changes $\Delta C$ and $\Delta C'$ with respect to $C_0$. Further, when the amount of the difference is such that $C_2$ is subtracted from $C_1$ (or the amount of the difference is such that $C_1$ is subtracted from $C_2$), as shown in Table 3, the amount of change of the electrostatic capacity due to the acceleration in the X direction can be easily detected. Thus, only the magnitude of the acceleration in the X direction can be detected.

According to this embodiment, in the same way as in the second embodiment, it is possible to detect an acceleration of both the X and Y directions. Further, since two acceleration detection devices described in the second embodiment are provided, it is possible to obtain an amount of change of the electrostatic capacity larger than in a case in which only one acceleration detection device is provided. Thus, it is possible to detect the magnitude of the acceleration with a higher degree of accuracy. Further, since the acceleration detection devices 1A and 1B are provided symmetrically with respect to the symmetry reference plane, when an acceleration is applied in the X direction, the flexing directions of the beams 4A and 4B become opposite to each other. For this reason, the determination of the difference between the electrostatic capacities C1 and C2 makes it possible to easily detect only the magnitude of the acceleration in the X direction.

Figure 9:
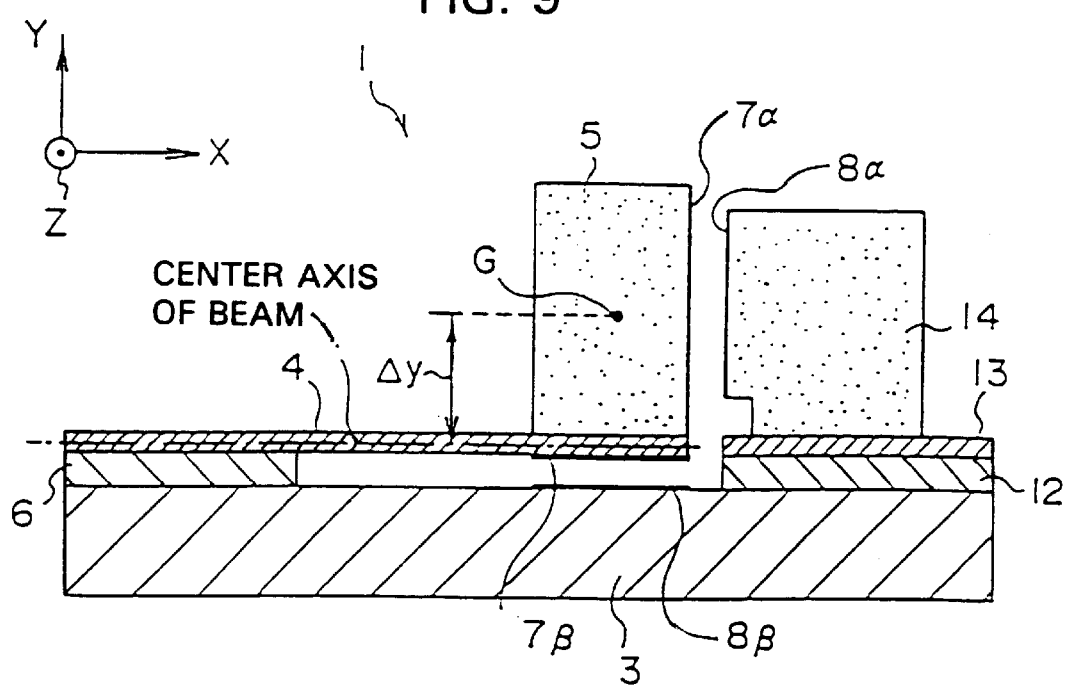
FIG. 9 is an illustration of another embodiment of the present invention.

The present invention is not limited to each of the above-described embodiments, and various modifications can be made. For example, in the first, third, fourth, and fifth embodiments, a pair of the movable electrodes 7 (7A, 7B) and the fixed electrodes 8 (8A, 8B) which are upright with respect to the board 3 are provided, and in the second and sixth embodiments, a pair of the movable electrodes 7' (7'A, 7'B) and the fixed electrodes 8' (8'A and 8'B) which are formed parallel to the board surface of the board 3 are provided. However, as shown in FIG. 9, a pair of a movable electrode 7α and a fixed electrode 8α which are upright with respect to the board 3 may be provided, and a pair of a movable electrode 7β and a fixed electrode 8β which are formed parallel to the surface of the board 3 may be provided.

Figure 7A:
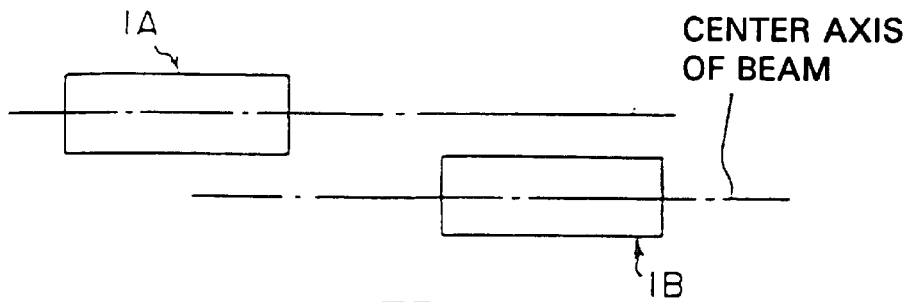
FIGS. 7A and 7B are illustrative examples of arrangements using two acceleration detection devices.
Figure 7B:
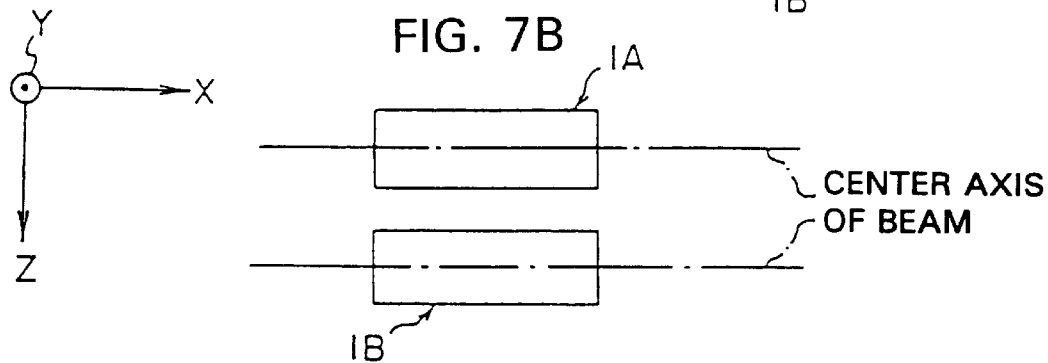
Figure 8A:
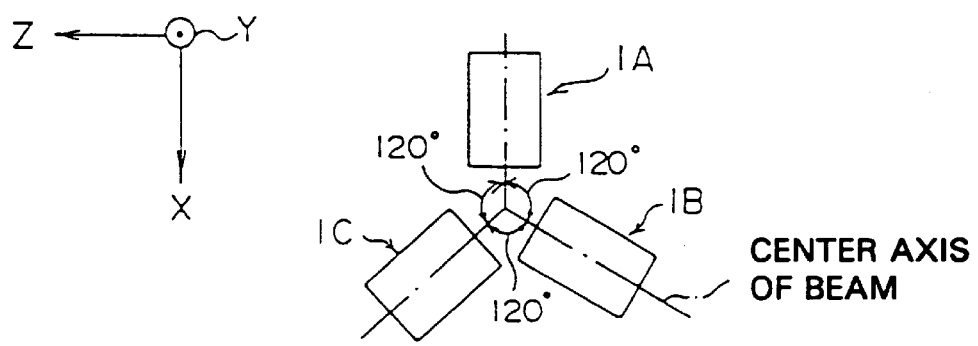
FIGS. 8A and 8B are illustrative examples of arrangements using three acceleration detection devices.
Figure 8B:
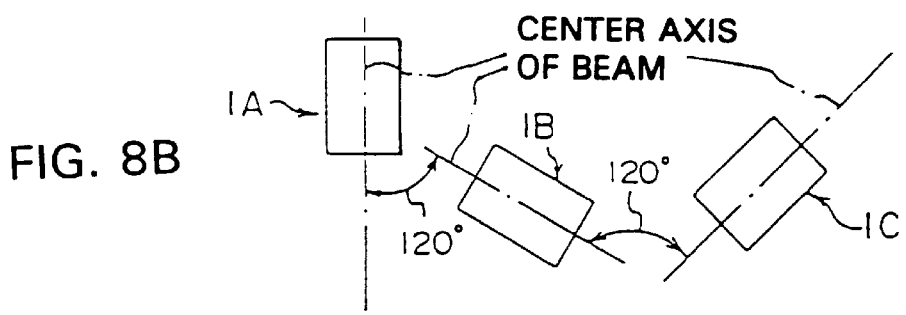

Although in the above-described fourth to sixth embodiments the acceleration detection devices 1A and 1B are provided so as to be symmetrical with respect to the symmetry reference plane, namely, the center axes thereof along the length of the beam 4 are coaxial, as shown in FIGS. 7A and 7B, it may be possible that the acceleration detection devices 1A and 1B are arranged such that the center axes of the beams 4 are parallel to each other, or so that the center axes of the beams 4 are crosswise to each other, as shown in FIGS. 8A and 8B.

Although the above-described fourth to sixth embodiments describe an example in which two acceleration detection devices 1 described in the first, second or third embodiment are provided, it may be possible to provide three or more acceleration detection devices. However, in such a case, i.e., when the number of acceleration detection devices formed is three or more, the respective acceleration detection devices should preferably be arranged mutually at a plane angle of 360°/N, where $N \geq 3$, because such orientation facilitates the analysis of the electrostatic capacity or the like. Thus, as shown in FIGS. 8A and 8B, when three of the acceleration detection devices 1A, 1B and 1C are to be provided, these are preferably provided with the center axes along the length of the beams 4 of the acceleration detection devices 1A to 1C mutually making a plane angle of (360°/3)=120°. Of course, a plurality of acceleration detection devices may be arranged without being limited to the plane angle of 360°/N. The arrangement of a plurality of acceleration detection devices at a plane angle other than 180° makes it possible to detect acceleration not only in both the X and Y directions, but also in directions other than those directions.

Figure 10A:
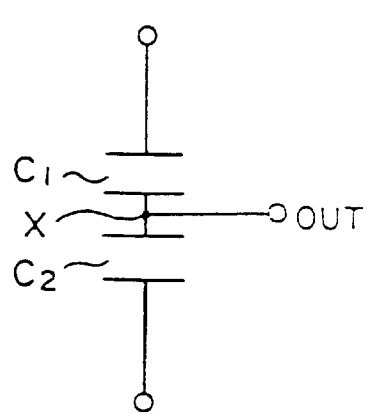
FIGS. 10A & B is a circuit diagram illustrating an example of connection between capacitors having electrostatic capacities $C_1$ and $C_2$ when a voltage corresponding to the sum of or the difference between the electrostatic capacities $C_1$ and $C_2$ is detected.
Figure 10B:
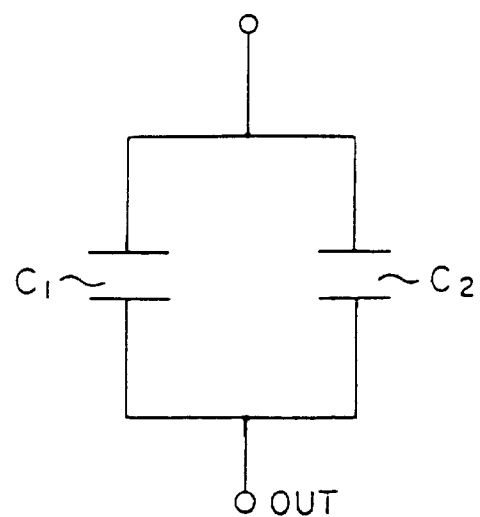
Figure 11:
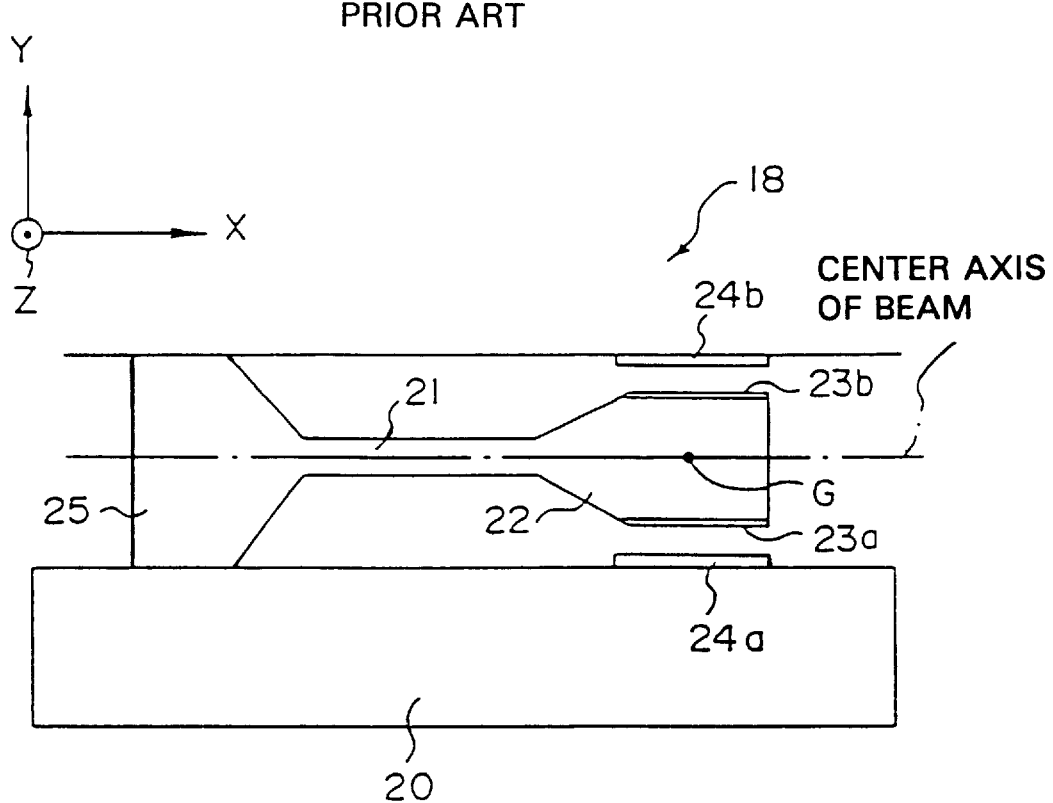
FIG. 11 shows a conventional acceleration detection device.

In addition, in the third embodiment, when the difference between the electrostatic capacities C1 and C2 between the movable electrodes 7A and 7B and the fixed electrodes 8A and 8B is to be determined, C1 and C2 are detected, and then the difference between the electrostatic capacities C1 and C2 is determined by signal processing. However, it is possible to determine the difference between C1 and C2 by incorporating the acceleration detection device into the following detection circuit. For example, when the difference between C1 and C2 is to be obtained, two pairs of movable electrodes 7A and 7B and fixed electrodes 8A and 8B shown in FIG. 3A are connected in series as shown in FIG. 10A. By detecting the voltage at the series connection point X, the voltage corresponding to the difference between C1 and C2 can be detected. When the sum of C1 and C2 is to be obtained, two pairs of movable electrodes 7A and 7B and fixed electrodes 8A and 8B are connected in parallel as shown in FIG. 10B, and thus the voltage corresponding to the sum of C1 and C2 can be detected. The sum of and difference between the electrostatic capacities can be determined for the fourth to sixth embodiments in the same way as that described above.

Further, in the third to sixth embodiments, a plurality of pairs of the movable electrodes 7A and 7B and the fixed electrodes 8A and 8B are provided. In the pairs of those movable electrodes 7A and 7B and the fixed electrodes 8A and 8B, all of the respective electrostatic capacities are equal to each other when no acceleration is applied, and when an acceleration is applied in the X or Y direction, the movable electrodes 7A and 7B and the fixed electrodes 8A and 8B are provided in order that the electrostatic capacity varies by nearly the same degree in proportion to the magnitude of the acceleration. However, when no acceleration is applied, the electrostatic capacities of the pair of movable electrodes 7A and 7B and the fixed electrodes 8A and 8B need not be equal to each other, and the electrostatic capacities need not to vary by nearly the same degree.

According to the present invention, a weight is provided at the front end of a cantilever and the position of the gravity of this weight is set at a position spaced perpendicularly apart from the center axis along the length of the cantilever so that it can be flexibly deformed when an acceleration is applied along the length of the cantilever. Therefore, not only when an acceleration in a direction perpendicular to the board surface is applied, but also when an acceleration is applied along the length of the cantilever, an inertial moment proportional to the magnitude of the acceleration acts, and the weight is displaced in linkage with the flexing and deformation of the beam. The movable electrode is displaced due to the displacement of the weight, causing the electrode-to-electrode distance between the movable electrode and the fixed electrode to vary and causes the electrostatic capacity between the movable electrode and the fixed electrode to vary. Thus, the magnitude of the acceleration or the like can be detected on the basis of the amount of such change of the electrostatic capacity. That is, the acceleration detection device of the present invention is capable of detecting acceleration in a direction perpendicular to the board surface and in a direction along the length of the beam.

In addition, revolutionary advantages can be shown, for example, in a case in which two acceleration detection devices in accordance with the first, second and third aspects of the present invention are formed and the acceleration detection devices are mutually arranged at a plane angle of 180°, it is possible to detect accelerations in the above-described two directions with a higher degree of accuracy, and only the magnitude of the acceleration in one direction perpendicular to the board surface or along the length of the beam can be detected. Further, in a case in which N acceleration detection devices in accordance with the first, second and third aspects of the present invention are formed and mutually arranged at a plane angle of 360°/N, it becomes possible to detect accelerations in two or more directions.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An acceleration detection device which comprises:
a flexible cantileveredly mounted beam having a horizontally extending axis;
a weight at the free end of the beam, the center of gravity of the weight being spaced vertically from the axis of the beam so that the beam flexes when acceleration is applied to the weight,
first and second movable electrodes each arranged to move with the flexing of the beam;
the first movable electrode being mounted on a first vertical face of the weight and the second movable electrode being mounted on a second vertical face of the weight opposite to the first vertical face; and
first and second fixed electrodes, the first fixed electrode being fixedly mounted adjacent to but spaced from the first moveable electrode to form a first capacitor with the first movable electrode, the capacitance of the first capacitor being a function of the spacing between the first movable and the first fixed electrode which varies in accordance with the acceleration applied to the weight, the second fixed electrode being fixedly mounted adjacent to but spaced from the second movable electrode to form a second capacitor with the second movable electrode, the capacitance of the second capacitor being a function of a spacing between the second movable electrode and the second fixed electrode with varies in accordance with the acceleration applied to the weight; the first and second fixed electrodes being vertically mounted on respective fixed supports opposite to the first and second movable electrodes, respectively.

2. An acceleration detection device which comprises:
a flexible cantileveredly mounted beam having a horizontally extending axis;
a weight at the free end of the beam, the center of gravity of the weight being spaced vertically from the axis of the beam so that the beam flexes when acceleration is applied to the weight;
first and second movable electrodes each arranged to move with the flexing of the beam;
first and second fixed electrodes, the first fixed electrode being fixedly mounted adjacent to but spaced from the first moveable electrode to form a first capacitor with the first movable electrode, the capacitance of the first capacitor being a function of the spacing between the first movable and the first fixed electrode which varies in accordance with the acceleration applied to the weight, the second fixed electrode being fixedly mounted adjacent to but spaced from the second movable electrode to form a second capacitor with the second movable electrode, the capacitance of the second capacitor being a function of a spacing between the second movable electrode and the second fixed electrode which varies in accordance with the acceleration applied to the weight;
the first movable electrode being mounted on a vertical face of the weight and the first fixed electrode being vertically mounted on a fixed support opposite the first vertical face; and
the second movable electrode being mounted on a horizontal surface of the beam and the second fixed electrode being horizontally mounted on a fixed support opposite to the second movable electrode.

3. Apparatus for detecting acceleration, which comprises:
a plurality of acceleration detection devices, each of which includes:
a cantileveredly mounted flexible beam having a horizontally extending axis;
a weight at the free end of the beam, the center of gravity of the weight being spaced vertically from the axis of the beam so that the beam flexes when acceleration is applied to the weight;
a movable electrode arranged to move with the flexing of the beam; and a fixed electrode fixedly mounted adjacent to but spaced from the movable electrode to form a capacitor with the movable electrode, the capacitance of the capacitor being a function of the spacing between the movable and fixed electrodes which varies in accordance with the acceleration applied to the weight;

wherein in each acceleration detection device the movable electrode is mounted on a vertical face of the weight and the fixed electrode is vertically mounted on a fixed support opposite to the movable electrode.

4. Apparatus for detecting acceleration according to claim 3, including N acceleration detection devices (N≧3), the acceleration detection devices being mutually arranged such that the horizontal axes of their respective beams intersect at plane angles of 360°/N.

5. Apparatus for detecting acceleration, which comprises:

a plurality of acceleration detection devices, each of which includes:

a flexible cantileveredly mounted beam having a horizontally extending axis;

a weight at the free end of the beam, the center of gravity of the weight being spaced vertically from the axis of the beam so that the beam flexes when acceleration is applied to the weight;

first and second movable electrodes each arranged to move with the flexing of the beam; and first and second fixed electrodes, the first fixed electrode being fixedly mounted adjacent to but spaced from the first moveable electrode to form a first capacitor with the first movable electrode, the capacitance of the first capacitor being a function of the spacing between the first movable and the first fixed electrode which varies in accordance with the acceleration applied to the weight, the second fixed electrode being fixedly mounted adjacent to but spaced from the second movable electrode to form a second capacitor with the second movable electrode, the capacitance of the second capacitor being a function of a spacing between the second movable electrode and the second fixed electrode which varies in accordance with the acceleration applied to the weight;

wherein in each acceleration detection device:

the first movable electrode is mounted on a first vertical face of the weight and the second movable electrode is mounted on a second vertical face of the weight opposite to the first vertical surface; and the first and second fixed electrodes are vertically mounted on respective fixed supports opposite to the first and second movable electrodes, respectively.

6. Apparatus for detecting acceleration according to claim 5, including N acceleration detection devices (N≧3), the acceleration detection devices being mutually arranged such that the horizontal axes of their respective beams intersect at plane angles of 360°/N.

7. Apparatus for detecting acceleration which comprises:

a plurality of acceleration detection devices, each of which includes:

a flexible cantileveredly mounted beam having a horizontally extending axis;

a weight at the free end of the beam, the center of gravity of the weight being spaced vertically from the axis of the beam so that the beam flexes when acceleration is applied to the weight;

first and second movable electrodes each arranged to move with the flexing of the beam; and first and second fixed electrodes, the first fixed electrode being fixedly mounted adjacent to but spaced from the first moveable electrode to form a first capacitor with the first movable electrode, the capacitance of the first capacitor being a function of the spacing between the first movable and the first fixed electrode which varies in accordance with the acceleration applied to the weight, the second fixed electrode being fixedly mounted adjacent to but spaced from the second movable electrode to form a second capacitor with the second movable electrode, the capacitance of the second capacitor being a function of a spacing between the second movable electrode and the second fixed electrode which varies in accordance with the acceleration applied to the weight;

wherein in each acceleration detection device:

the first movable electrode is mounted on a vertical face of the weight and the first fixed electrode is vertically mounted on a fixed support opposite the first vertical face; and the second movable electrode is mounted on a horizontal surface of the beam and the second fixed electrode is horizontally mounted on a fixed support opposite to the second movable electrode.

8. Apparatus for detecting acceleration according to claim 7, including N acceleration detection devices (N≧3), the acceleration detection devices being mutually arranged such that the horizontal axes of their respective beams intersect at plane angles of 360°/N.

* * * * *